(12) United States Patent
Kromwijk et al.

(10) Patent No.: US 9,470,565 B2
(45) Date of Patent: Oct. 18, 2016

(54) DEVICE FOR DETERMINING A MASS FLOW RATE OF A FLUID IN A CHANNEL BY MEASURING ELECTRICAL CONDUCTIVITY USING ELECTRODES

(71) Applicant: Fusion Electronics B.V., Houten (NL)

(72) Inventors: Antonius Cornelis Johannes Kromwijk, Houten (NL); Bram Visser, Dunedin (NZ)

(73) Assignee: Fusion Electronics B.V., Houten (NL)

( * ) Notice: Subject to any disclaimer, the term of this patent is extended or adjusted under 35 U.S.C. 154(b) by 0 days.

(21) Appl. No.: 14/389,703

(22) PCT Filed: Apr. 2, 2013

(86) PCT No.: PCT/NL2013/050245
§ 371 (c)(1),
(2) Date: Sep. 30, 2014

(87) PCT Pub. No.: WO2013/165236
PCT Pub. Date: Nov. 7, 2013

(65) Prior Publication Data
US 2015/0059491 A1     Mar. 5, 2015

(51) Int. Cl.
| | |
|---|---|
| *G01F 1/66* | (2006.01) |
| *G01F 1/64* | (2006.01) |
| *A01J 5/01* | (2006.01) |
| *G01F 1/708* | (2006.01) |
| *G01F 1/712* | (2006.01) |
| *G01F 1/74* | (2006.01) |
| *G01F 1/86* | (2006.01) |
| *G01F 25/00* | (2006.01) |

(52) U.S. Cl.
CPC .. *G01F 1/64* (2013.01); *A01J 5/01* (2013.01); *G01F 1/708* (2013.01); *G01F 1/712* (2013.01); *G01F 1/74* (2013.01); *G01F 1/86* (2013.01); *G01F 25/0007* (2013.01)

(58) Field of Classification Search
None
See application file for complete search history.

(56) References Cited

U.S. PATENT DOCUMENTS

| | | | | |
|---|---|---|---|---|
| 4,163,389 | A * | 8/1979 | Suzuki | G01F 1/64 73/861.09 |
| 4,754,649 | A | 7/1988 | Lew | |
| 5,837,902 | A | 11/1998 | Veneruso et al. | |
| 6,604,053 | B2 * | 8/2003 | Fematt | A01J 5/01 702/100 |
| 6,741,942 | B2 * | 5/2004 | Kapitulskiy | A01J 5/01 702/45 |
| 2002/0156589 | A1 | 10/2002 | Fematt | |
| 2003/0130808 | A1 * | 7/2003 | Kapitulskiy | A01J 5/01 702/45 |
| 2004/0194553 | A1 | 10/2004 | Kaever | |
| 2009/0025485 | A1 | 1/2009 | Krone et al. | |
| 2014/0247532 | A1 * | 9/2014 | Momose | G01F 1/60 361/154 |

FOREIGN PATENT DOCUMENTS

EP     1443313   A2     8/2004

* cited by examiner

*Primary Examiner* — Harshad R Patel
(74) *Attorney, Agent, or Firm* — The Webb Law Firm

(57) ABSTRACT

The present invention relates to a device for determining a mass flow rate of a fluid in a conduit, for instance a milk flow through a tube. The device includes a measuring member for determining an electrical conductivity of the fluid; an additional measuring member for determining the electrical conductivity of the fluid at an additional position; and a processing unit for determining the mass flow rate of the fluid in the conduit on the basis of the determinations, wherein the specific resistance can be determined per cross-sectional area in the flow.

23 Claims, 7 Drawing Sheets

DEVICE FOR DETERMINING A MASS FLOW RATE OF A FLUID IN A CHANNEL BY MEASURING ELECTRICAL CONDUCTIVITY USING ELECTRODES

CROSS-REFERENCE TO RELATED APPLICATIONS

This application is the United States national phase of International Application No. PCT/NL2013/050245 filed Apr. 2, 2013, and claims priority to Netherlands Patent Application No. 2008577 filed Mar. 30, 2012, the disclosures of which are hereby incorporated in their entirety by reference.

BACKGROUND OF THE INVENTION

1. Field of the Invention

The present invention relates to a device for determining a mass flow rate of a fluid in a conduit.

A further aspect of the invention relates to a method for determining a mass flow rate of a fluid in a conduit.

2. Description of Related Art

It is known per se to determine a mass flow rate of a fluid in a conduit. A free-flow milk meter which is currently commercially available determines the quantity of milk present in a part of the milk meter for a determined period of time. By integrating all values of determined measurement quantities the overall milk yield is calculated in a time segment.

A drawback of such a free-flow milk meter is that the determined milk yield often differs in practice from the actual milk yield.

SUMMARY OF THE INVENTION

The present invention has for its object to obviate or at least reduce such a drawback of the known art. The invention provides for this purpose a device for determining a mass flow rate of a fluid in a conduit, for instance a milk flow through a tube, the device comprising:
  a measuring member for determining an electrical conductivity of the fluid;
  an additional measuring member for determining the electrical conductivity of the fluid at an additional position; and
  a processing unit for determining the mass flow rate of the fluid in the conduit on the basis of the determinations, wherein the specific resistance can be determined per cross-sectional area in the flow.

An advantage of the device according to the invention is that the determined milk yield corresponds to the actual milk yield, or has at least an acceptable deviation.

The resistance of a fluid is directly proportional to the electrical conductivity of this fluid. This means that, when preferably the resistance at the position of a measuring member can be determined in a slice, more preferably substantially perpendicularly of the flow direction of the fluid, it is possible to determine the electrical conductivity of the fluid at the position of the measuring member. Using the known electrical conductivity it is possible to determine the characteristic density of the fluid at the position of the measuring member by means of formulae known to the skilled person in the field.

In the case the device is applied to measure a milk flow during the milking of a cow, it is then conceivable that the milk flow changes continuously. At one moment there will be more air and foam in the fluid flow than at the next moment. The characteristic density is therefore subject to change depending on the fluid flow. Owing to the fact that the characteristic density is subject to change and is determined at two separate positions, it is possible to determine the flow speed of the fluid, wherein this speed is determined a number of times within a predetermined period of time, for instance at a frequency of 2 kHz.

The characteristic density is further a measure of the actual quantity of milk at the position of the measuring member. It is possible to accurately determine the mass flow rate of the milk through the tube by measuring the actual quantity of milk at a determined point in time and also determining the flow speed at this same point in time.

The invention has diverse preferred embodiments which will become apparent from the following description of several such embodiments. The advantageous inventive features of the invention in all its aspects, including the measures defined in the dependent claims, are by no means limited to the considerations stated above and/or below.

A first preferred embodiment of a device according to the invention has the feature that the measuring member and/or the additional measuring member has/have a circular form. An advantage of this embodiment is that the measuring member can in this way be arranged on a surface of a conduit without changes being necessary to the conduit, which in practice is often already present. In the case a new tube is arranged, it is then possible to use a conventional tube, thereby for instance saving unnecessary costs.

A further preferred embodiment of a device according to the invention has the feature that the measuring member and/or the additional measuring member can be placed on an inner surface of the conduit so that the measuring member and/or the additional measuring member is in contact with the fluid during use. An advantage of this embodiment is that, because the measuring member is in direct contact with the fluid, the measuring results are better. Possible changes in the fluid are immediately detectable at the measuring member, so that smaller changes are also detectable.

A preferred embodiment of a device for determining a mass flow rate of a fluid in a conduit has the feature that each of the measuring member and the additional measuring member comprises an electrode pair. It is advantageous here for each electrode pair to comprise a first electrode and a second electrode which are arranged insulated from each other. Applied to the electrode pair is a wave signal, the current value of which is measured. When the current value is known, it is then possible via a per se known formula to determine the electrical conductivity of the fluid. The use of an electrode pair makes it possible in relatively simple manner to determine the electrical conductivity of the fluid at the position of the measuring member and/or the additional measuring member.

The insulation material is present for the purpose of preventing the current flowing via a path other than a current path through the fluid.

In a further preferred embodiment measurement takes place in potentiometric manner, preferably wherein a voltage is measured by means of passive electrodes on the basis of a signal supplied externally relative to the passive electrodes. An advantage hereof is that the effects of polarization are prevented. The measurement depends directly on the conductivity of the solution. Electrolysis is further prevented, whereby a wide range of conductivity can be measured. A further cost-saving can for instance be achieved by applying cheaper stainless steel electrodes instead of the more costly platinum electrodes.

The device more preferably comprises work electrodes for preferably providing a signal for the purpose of measurements by the measuring members. An advantage hereof is that a wide measurement range can be realized, it being for instance possible here to achieve such an advantage by applying varying voltages, which variation can be realized while the measurements are being performed, whereby a high output resolution can be obtained.

In a further preferred embodiment a combination of the measuring member and the additional measuring member is arranged in a pair of work electrodes, preferably wherein the work electrodes are arranged for the purpose of providing a signal to both measuring members.

In a further preferred embodiment the device comprises a data file or access to a data file, wherein the data file comprises data relating to a predetermined correlation between parameters relating to the mass flow rate, such as speed, vacuum level, claw air bleed, liner slip, fluid viscosity, flow regime, sensor angle, more preferably for the purpose of calculations for estimating the speed under the influence of such parameters, preferably comprising predetermined data relating to the speed from an earlier data series based on controlled test situations.

It hereby becomes possible to realize an accurate determination during these periods of laminar flow. A change is made for this purpose to standardized values for performing the calculations relating to the speed of the fluid. When the end of a laminar part of the flow is reached, provision is made that the calibration calculations are applied for matching qualitatively high-grade measurements with the standardized values. A balance is struck here in respect of the probability of the actual measurements and the known probability of the previously realized calibrated measurements.

The device more preferably comprises correlating means for correlating ongoing measurements with data of calibrated previous measurements.

According to a further preferred embodiment, the device further comprises a reference measuring member for performing reference measurements, preferably in potentiometric manner by means of a pair of work electrodes with measuring electrodes arranged therebetween, more preferably arranged in a protrusion, more preferably provided with an electrode pair which is configured to determine at least one reference value, such as the specific resistance, of the electrical conductivity of the fluid.

The electrical conductivity of a fluid, particularly milk, is subject to changes as a result of for instance salts present in the milk. The quantity of salts in the milk depends for instance on the feed which for instance a cow has eaten, or the environment in which the cow is located.

An electrical conductivity in substantially degassed milk can be determined by applying the reference measuring member, whereby a relation between the two becomes known. The electrical conductivity measured at the measuring member and the additional measuring member is plotted against the measured electrical conductivity of air and of stationary milk. An advantage hereof is that it is possible to determine how much milk is present at the position of the measuring member at the time of the measurement, particularly when circular measuring members, such as circular electrodes, are applied. Providing the reference measuring member in a bulge of the conduit achieves that the electrical conductivity of the milk without air is determined.

It is advantageous here for the additional measuring member to lie at a predetermined distance from the measuring member and for the additional measuring member to lie downstream of the measuring member in the arranged situation. It is in this way possible to determine the flow speed of the fluid on the basis of changes in the specific resistance/electrical conductivity in combination with the distance between the measuring member and the additional measuring member. When the speed is taken in combination with the characteristic density, it is then possible to determine the mass flow rate of the fluid through the conduit.

A further embodiment of the device according to the invention has the feature that the reference measuring member is provided upstream or downstream of the measuring member. An advantage of this embodiment is that during the measurement of the specific resistance the height of the measuring member and/or the additional measuring member is not affected by the reference measuring member.

A further preferred embodiment of the device according to the invention has the feature that a type of flow of the fluid through the conduit may be changed. Since the flow speed of the fluid through the tube is determined on the basis of changes in the specific resistance and/or electrical conductivity of the fluid, these changes also being brought about by a change in the quantity of milk at the position of the measuring member and/or the additional measuring member, determining of the flow speed of the fluid is simplified when the type of flow may be changed. The measuring results of the measuring member and/or the additional measuring member are influenced by the change in the type of flow, so that the flow speed of the fluid through the conduit can be properly determined.

It is advantageous here that a Kármán vortex street can be realized in the fluid flow, preferably by placing an object in the fluid flow. The inventor has discovered that such a vortex street has a positive effect on the measuring results of the measuring member and/or the additional measuring member. In other words, good results have been obtained using this vortex street.

A further preferred embodiment of the device according to the invention has the feature that during use a wave signal can be applied to each electrode pair. It is known per se that, when an electrode is arranged in a fluid, particularly a liquid, gas formation can occur on the surfaces of the electrode pair. In order to apply a wave signal to the electrode pair the polarity of each electrode is switched subject to the wave signal. An advantage hereof is that gas formation on the surfaces of the electrode pair is prevented.

A further aspect of the invention relates to a method for determining a mass flow rate of a fluid in a conduit, for instance a milk flow through a tube, the method comprising steps for:
applying a wave signal to a measuring member and an additional measuring member;
determining an electrical conductivity of the fluid at the position of the measuring member and the additional measuring member; and
determining the mass flow rate of the fluid on the basis of the determinations,
characterized by
repeating the step of determining the electrical conductivity within a predetermined period of time.

An advantage of this method is that, due to the fact that the flow speed of the fluid within the conduit is determined repeatedly, the mass flow rate of the fluid is determined repeatedly. The overall mass flow rate of the fluid through the conduit is hereby accurately determined.

A preferred embodiment of the method according to the invention has the feature that the predetermined period corresponds to a sampling frequency in a range of 1 kHz-20 kHz, preferably 1.5 kHz-10 kHz, preferably 1.8-5 kHz, preferably about 2 kHz. The inventor has discovered that at these frequencies the randomness of the determination of the mass flow rate of the fluid through the conduit falls within the desired accuracy. The higher the frequency, the more overlap there will occur between the different measurements. A result of this is that changes in the electrical conductivity/specific resistance of the fluid are followed accurately. The mass flow rate can hereby be determined more precisely.

It is advantageous here for the wave signal to have a form selected from the group comprising: sine, sawtooth and block. The form of the wave signal influences the results of the measurements, depending on the type of measurement. A result of this is that good measuring results can be obtained in a wide range of conditions.

A further preferred embodiment of the method according to the invention comprises steps for correlating the determination of the measuring member and the determination of the additional measuring member. It is in this way possible to determine the flow speed of the fluid in the conduit. A possible deceleration of the fluid between the measuring member and the additional measuring member will further be discerned during the correlation of the two determinations. The same will be the case for a decrease in an amplitude of the measurement signal.

The method more preferably comprises steps for applying the wave signal directly to electrodes of the measuring member, or steps for applying the wave signal to work electrodes, wherein the wave signal functions over measuring electrodes. Similar advantages as stated in the foregoing are hereby realized.

BRIEF DESCRIPTION OF THE DRAWINGS

Following below is a description of several embodiments which are shown in the accompanying drawings and provided only by way of example, and in which the same or similar parts, components and elements are designated with the same reference numerals, and in which.

DESCRIPTION OF THE INVENTION

Figure 1:
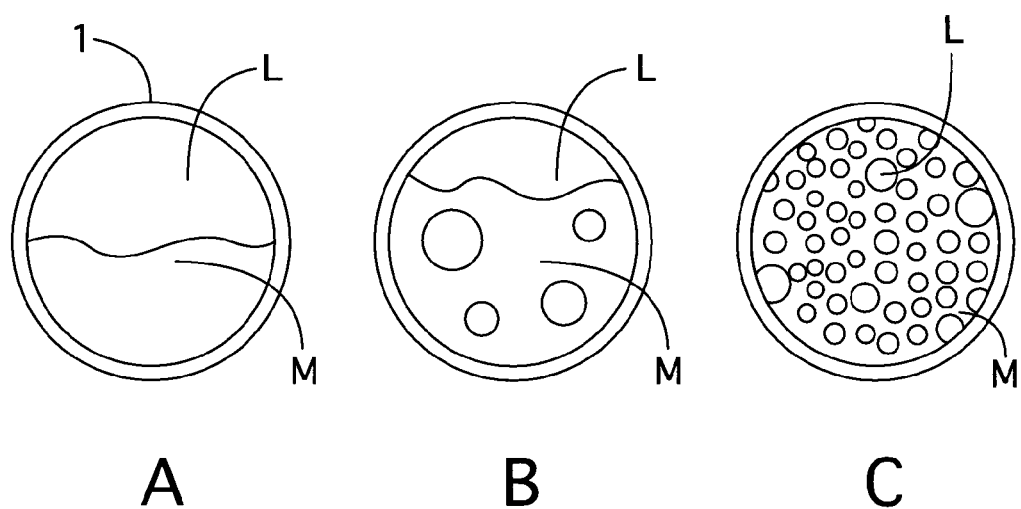
FIG. 1 shows cross-sections of different types of flow.

FIG. 1 shows cross-sections of different types of flow. Each of the different types of flow produces a different measuring result, which is determined by means of the measuring member and the additional measuring member. The different types of flow have different distributions in respect of air L and milk M in the tube, as well as different ratios of milk and air L. The differences result in different types of measurement signal, wherein the measurement signals are a measure of the quantity of milk M present at the position of the measuring member. FIG. 1a shows a laminar (stratified) flow, FIG. 1b shows a bubble flow and FIG. 1c shows a foam flow. The flow is moving through a tube 1.

Figure 2:
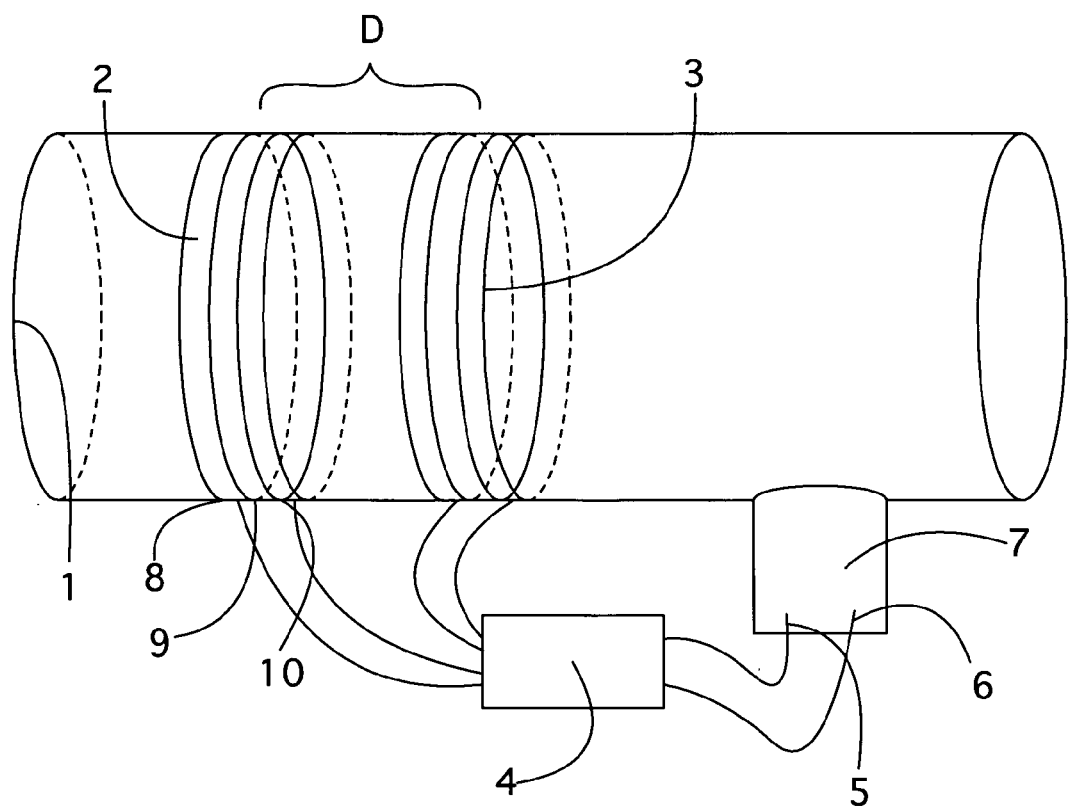
FIG. 2 shows an embodiment of a device according to the invention.

FIG. 2 shows an embodiment of a device according to the invention. In this embodiment the device is arranged on an inner surface of a tube 1. The device comprises a first electrode pair 2 and a second electrode pair 3 arranged a determined distance D relative to each other. Each electrode pair 2, 3 comprises a first electrode 8, an insulating material 9 and a second electrode 10. The electrode pairs 2, 3 are connected to a control unit 4 which sends signals to the electrode pairs 2, 3 and which determines the electrical conductivity of the fluid at the position of the electrode pairs 2, 3. Further provided is a chamber 7 in which two electrodes 5, 6 are arranged. The fluid, such as milk, present in chamber 7 is substantially homogenous and comprises substantially no foam or air bubbles. On the basis of the substantially homogenous milk the specific resistance of the milk is determined in a per se known manner by means of electrodes 5, 6 in the chamber. The specific resistance determined in chamber 7 is combined with the measurements of the electrical conductivity of the milk at the position of the electrode pairs 2, 3. It is in this way possible to determine how much milk is present at the position of the electrode pairs 2, 3 at a determined point in time.

Figure 3:
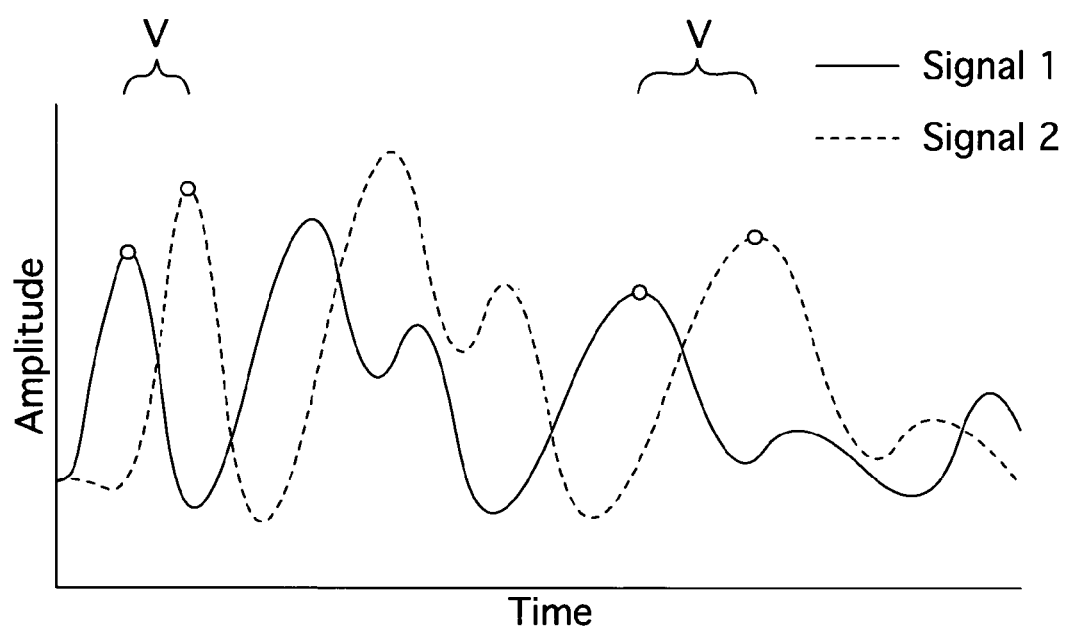
FIG. 3 shows a graph with measurement signals.

FIG. 3 shows a graph with measurement signals. Signal 1 is measured at the position of the first electrode pair 2 and signal 2 is measured at the position of the second electrode pair 3. The distance between these electrode pairs 2, 3 is known. The correlation between the two signals is determined by processing unit 4 so that the time the milk requires to move from the first electrode pair 2 to the second electrode pair 3, indicated in the figure with V, can be determined. Since the distance between the two electrode pairs 2, 3 is known, and the time the milk requires to move from the first electrode pair 2 to the second electrode pair 3, it is possible to determine the speed of the milk.

Further shown in the figure is that a decrease in the amplitude of signal 2 compared to signal 1 is detected by means of the correlation and has no adverse effect on the determination of the speed of the milk flow inside tube 1.

Figure 4:
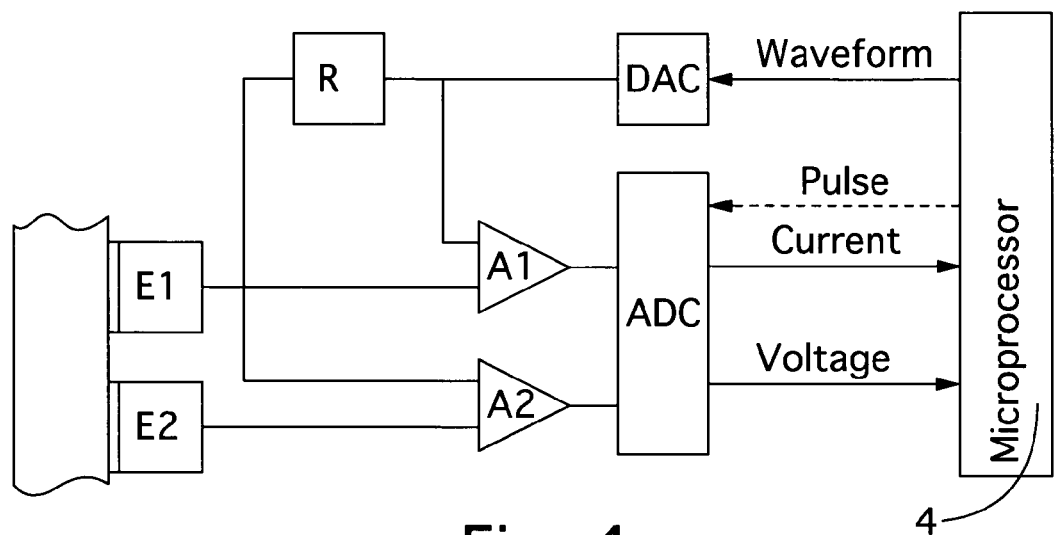
FIG. 4 shows a schematic overview of an embodiment of the device according to the invention.

FIG. 4 shows a schematic overview of an embodiment of an electrode pair 2, 3 according to the invention. Shown is a processing unit 4, wherein the device is connected to a tube 1. Electrode pairs E1 and E2 are connected to tube 1, and so in contact with the fluid. Processing unit 4 generates a (digital) wave signal which is converted by the DAC. The output passes through resistor R and A1 measures the current through R. The voltages over electrode pairs E1 and E2 are measured by A2. Both the measured current and voltage of respectively A1 and A2 are converted to digital by the ADC. Processing unit 4 transmits pulses to the ADC which coincide with the peaks of the generated wave signal. The ADC can hereby directly sample the maximum amplitude of the wave signal. The measured current and voltage samples are converted to digital and processing unit 4 calculates the electrical conductivity of the sample.

Figure 5:
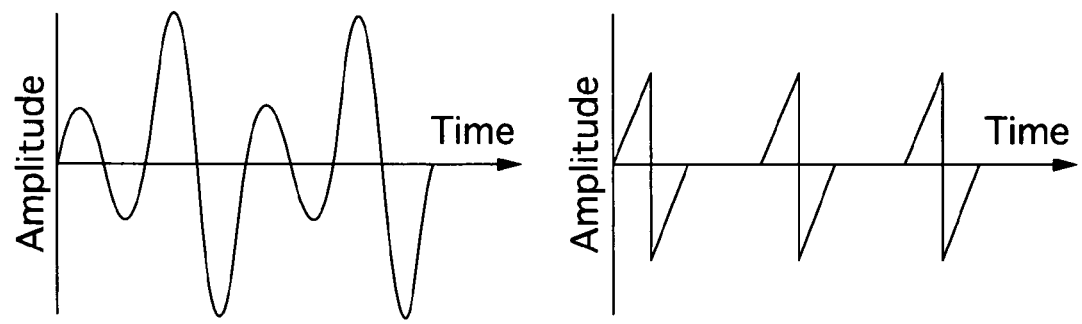
FIG. 5 shows different types of wave signal.

FIG. 5 shows different types of wave signal. The advantage of wave signals is that gas formation at the electrode pairs 2, 3 can be prevented. The wave signal can be adapted to the fluid to be measured and to the measurement conditions, since each condition requires a different wave signal. Shown is a sawtooth signal and a waveform signal.

Figure 6:
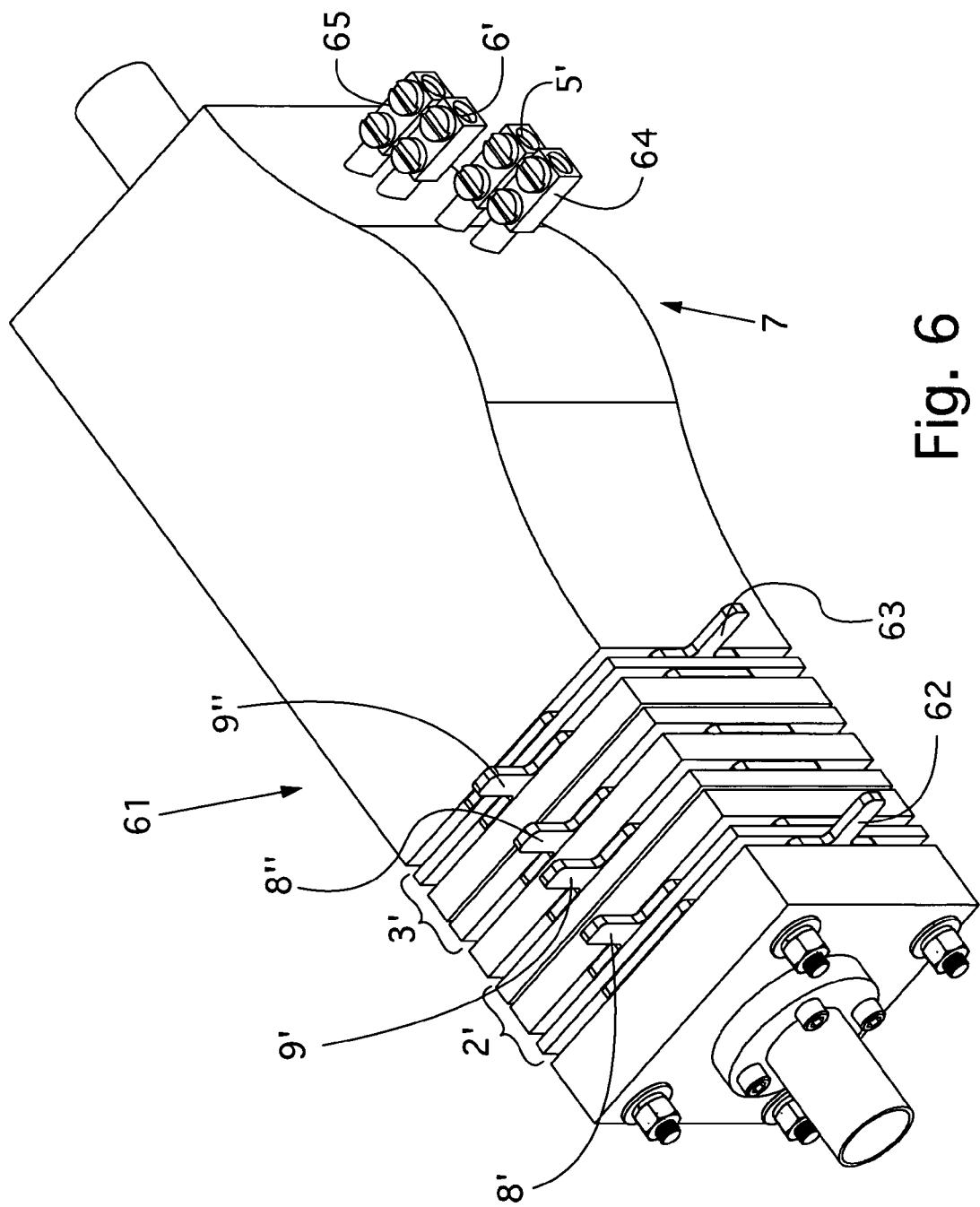
FIG. 6 shows a perspective view of a further preferred embodiment according to the present invention.
Figure 7:
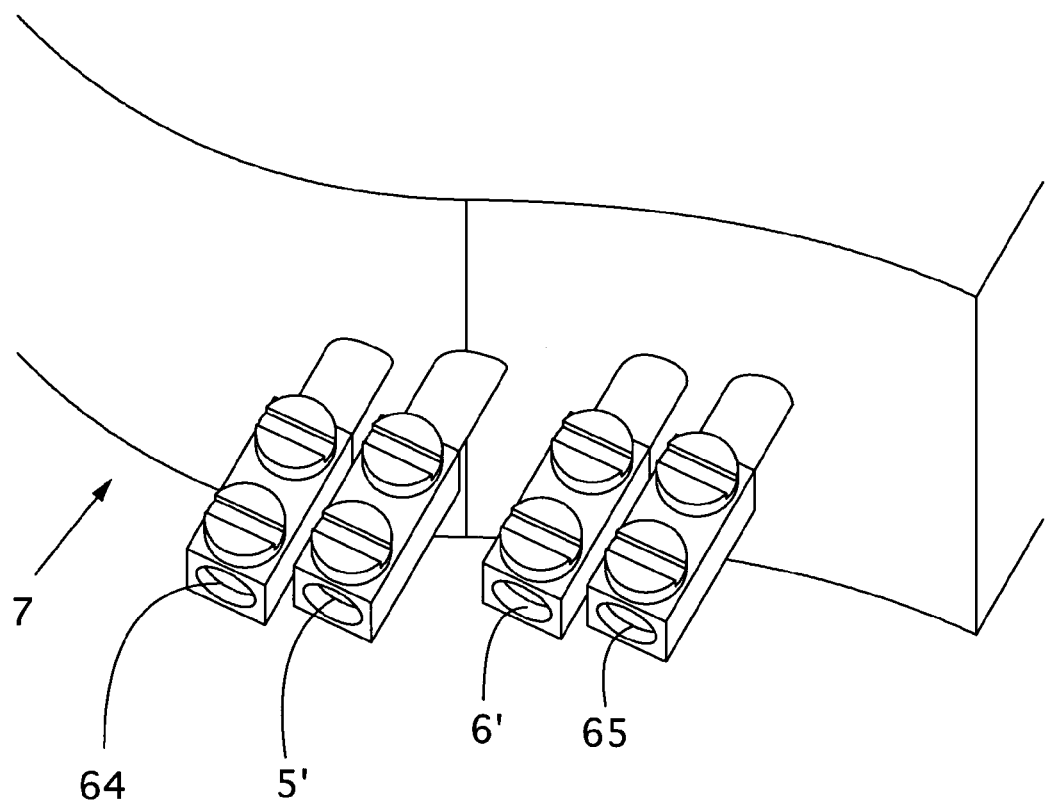
FIG. 7 shows a view of a detail of FIG. 6.

In the embodiment according to FIGS. 6 and 7 a measuring method is applied in accordance with the potentiometric principle. The embodiment relates to a measuring device 61. Measuring members 2', 3' are arranged close to the side of a milk flow tube. Arranged on either side hereof are two work electrodes 62, 63 so that the entity of measuring members 2', 3' is situated between the work electrodes. In this preferred embodiment the measurement signals are applied over work electrodes 62, 63, whereby the signals pass along both measuring members 2', 3'.

Figure 9:
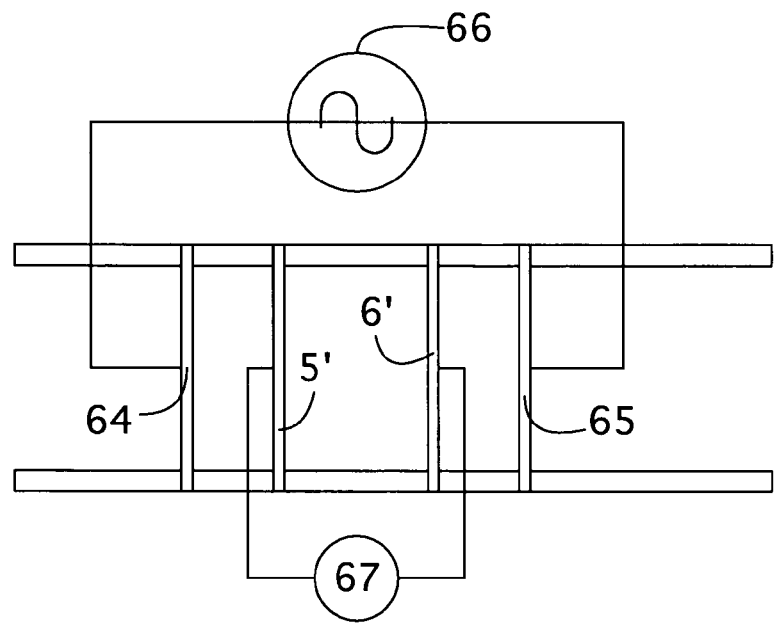
FIG. 9 shows a schematic representation of a further preferred embodiment according to the present invention.

Each of the measuring members 2', 3' is provided with a measuring electrode 8', 9' and 8", 9" respectively. The operation of each of the measuring members 2', 3' is as indicated in FIG. 9. Work electrodes 62, 63 (64, 65 respectively in FIG. 9) provide as embodied in similar manner as in FIG. 4 a measurement signal over electrodes 8', 9' and 8", 9" respectively (5', 6' respectively in FIG. 9). The measurement is performed by means of a voltage measurement over electrodes 8', 9' and 8", 9" respectively.

The measurement data are transmitted in similar manner as on the basis of FIG. 4 to a processing unit. A difference between FIG. 6 and FIG. 9 is that in FIG. 6 with one pair of work electrodes two pairs of work electrodes are provided with a signal. Provided for here is that the measurement signals from measuring members 2', 3' can be alternately recorded separately of each other.

Figure 8:
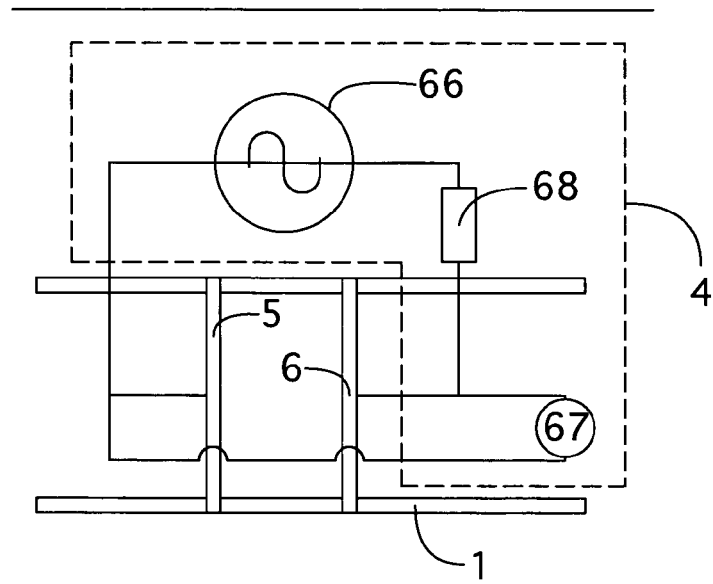
FIG. 8 shows a schematic representation of a preferred embodiment according to the present invention.

Formed close to the other end of measuring device 61 is a chamber 7 for providing a homogenous quantity of liquid therein. A reference measurement is performed on this homogenous quantity of liquid so that by means of calculations differences in the conductivity of the liquid flowing by, such as milk, in homogenous form can be eliminated from the calculations on the basis of the measuring members.

Where in the preferred embodiment according to FIG. 1 there are two electrodes for supplying the measurement signal and performing the measurement, in this preferred embodiment there are two work electrodes 64, 65 for providing the signal and two measuring electrodes 5', 6' (electrodes 5, 6 respectively in FIG. 8) for performing the measurement. It is therefore also the object in this preferred embodiment to perform the reference measurement close to the height measurement so that the variations in the conductivity of the fluid can be eliminated in isolation.

Figure 10:
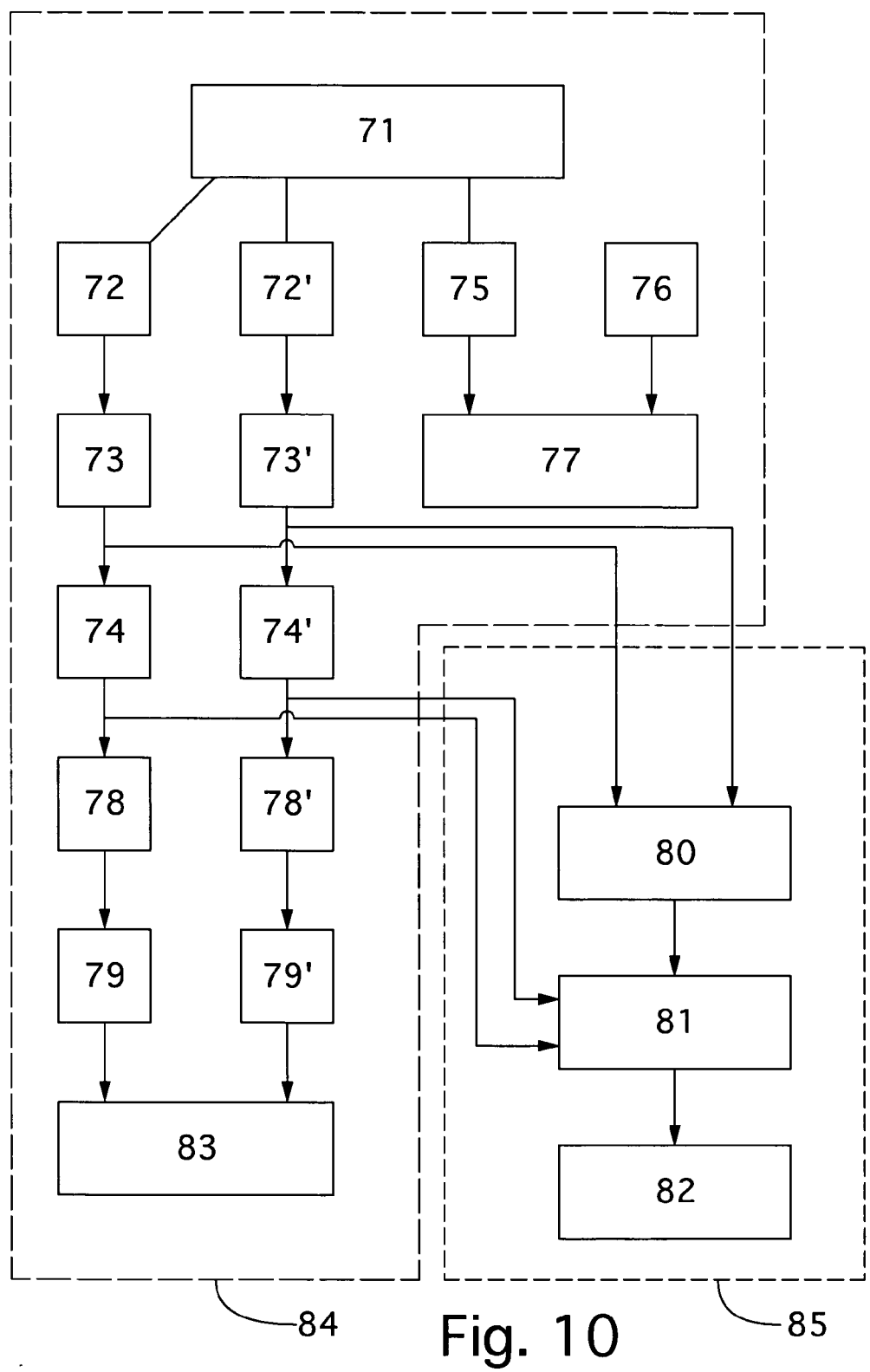
FIG. 10 shows a schematic representation of a measurement sequence according to a preferred embodiment according to the present invention.

Shown schematically in FIG. 10 is the method of the embodiment according to FIG. 6-7. The measurements by means of respective measuring members 2', 3' are shown in parallel on the left-hand side of the figure. A value for the resistance is provided in step 72, 72'. The reference value is provided in step 75. On the basis hereof, in combination with the temperature from step 76, an electrical conductivity of the milk is determined in step 77.

On the basis of the crude data relating to filling 73, 73' an estimated value 74, 74' in respect of the speed is either directly determined or, if the certainty in respect of the estimated value 74, 74' of the speed falls below a threshold value, a cross-correlation 80 is performed on the basis of values predetermined under calibrated conditions. The estimated values of the cross-correlation and of the direct measurement are compared in step 81 and modified subject to predetermined set parameters. A yield 82 is then determined on the basis hereof. These determinations can be performed outside the real time of the measurements, or corrections can be made.

The values 78, 78' in respect of an estimated flow speed are realized on the basis of the values 74, 74', after which estimated yields 79, 79' are determined on the basis hereof.

Finally, these values are added in order to determine an estimated total mass of fluid 83.

The present invention has been described in the foregoing on the basis of several preferred embodiments. Different aspects of different embodiments are deemed described in combination with each other, wherein all combinations which can be deemed by a skilled person in the field as falling within the scope of the invention on the basis of reading of this document are included. These preferred embodiments are not limitative for the scope of protection of this document. The rights sought are defined in the appended claims.

The invention claimed is:

1. A device for determining a mass flow rate of a fluid in a conduit having an inner surface and an outer surface, the device comprising:
   a measuring member arranged on the inner or the outer surface of the conduit for determining an electrical conductivity of the fluid in the conduit;
   an additional measuring member arranged on the inner or the outer surface of the conduit for determining the electrical conductivity of the fluid at an additional position in the conduit;
   a reference measuring member for determining a specific resistance of the fluid in the conduit; and
   a processing unit for determining the mass flow rate of the fluid in the conduit on the basis of the determinations of the electrical conductivity and specific resistance by the measuring member, the additional measuring member, and the reference measuring member,
   wherein determination of the electrical conductivity of the fluid in the conduit takes place via the measuring member and the additional measuring member on the basis of a signal supplied externally relative to the measuring member and the additional measuring member.

2. The device as claimed in claim 1, wherein the measuring member and/or the additional measuring member has/have a circular form.

3. The device as claimed in claim 1, wherein the measuring member and/or the additional measuring member reside on an inner surface of the conduit so that the measuring member and/or the additional measuring member is in contact with the fluid during use.

4. The device as claimed in claim 1, wherein each of the measuring member and the additional measuring member comprises an electrode pair.

5. The device as claimed in claim 4, wherein each electrode pair comprises a first electrode and a second electrode which are arranged insulated from each other.

6. The device as claimed in claim 1, wherein wherein a voltage is measured by means of electrodes of the measuring member and the additional measuring member on the basis of the signal supplied externally relative to the electrodes.

7. The device as claimed in claim 1, further comprising a work electrode for providing the signal for the purpose of measurements by the measuring member or the additional measuring member.

8. The device as claimed in claim 1, wherein a combination of the measuring member and the additional measuring member is arranged between a pair of work electrodes, wherein the work electrodes are arranged for the purpose of providing the signal to the measuring member and the additional measuring member.

9. The device as claimed in claim 1, further comprising a data file or access to a data file, wherein the data file comprises data relating to a predetermined correlation between parameters relating to the mass flow rate for the purpose of calculations for estimating the speed under the influence of such parameters, wherein the parameters relating to the mass flow rate include one or more of: speed, vacuum level, false air, liner slip, fluid viscosity, flow regime, and sensor angle.

10. The device as claimed in claim 1, further comprising means for correlating ongoing measurements with data of calibrated previous measurements.

11. The device as claimed in claim 1, wherein the reference measuring member comprises a pair of work electrodes with measuring electrodes arranged therebetween.

12. The device as claimed in claim 1, wherein the additional measuring member lies at a predetermined distance from the measuring member.

13. The device as claimed in claim 12, wherein the additional measuring member lies downstream of the measuring member.

14. The device as claimed in claim 1, wherein the reference measuring member is provided upstream or downstream of the measuring member.

15. The device as claimed in claim 1, wherein a type of flow of the fluid through the conduit is changed.

16. The device as claimed in claim 1, wherein turbulence is realized in the fluid flow.

17. The device as claimed in claim 4, further comprising signalling means for applying the signal to each electrode pair during use.

18. A method for determining a mass flow rate of a fluid in a conduit having an inner surface and an outer surface, the method comprising the steps of:
   a) determining a specific resistance of the fluid via a reference member;
   b) applying a wave signal to a measuring member arranged on the inner or the outer surface of the conduit and an additional measuring member arranged on the inner or the outer surface of the conduit;
   c) determining, based on the wave signal applied in step b), an electrical conductivity of the fluid at positions of the measuring member arranged on the inner or the outer surface of the conduit and the additional measuring member arranged on the inner or the outer surface of the conduit; and
   d) determining a mass flow rate of the fluid on the basis of the determinations of the specific resistance in step a) and the electrical conductivity in step c).

19. The method as claimed in claim 18, further including repeating steps
   b) and c) after a predetermined period of time.

20. The method as claimed in claim 19, wherein the predetermined period of time corresponds to a sampling frequency in a range of 1 kHz-20 kHz.

21. The method as claimed in claim 18, wherein the wave signal has a form selected from the group comprising: sine, sawtooth and block.

22. The method as claimed in claim 18, further comprising steps for correlating the determination of the measuring member and the determination of the additional measuring member.

23. The method as claimed in claim 18, further comprising applying the wave signal directly to electrodes of the measuring member, or applying the wave signal to work electrodes, wherein the wave signal functions over the measuring electrodes.

* * * * *